(12) United States Patent
Miyake et al.

(10) Patent No.: US 8,626,374 B2
(45) Date of Patent: Jan. 7, 2014

(54) IN-VEHICLE DEVICE FOR STORING GADGET

(75) Inventors: Kenji Miyake, Anjo (JP); Koichi Masuda, Obu (JP)

(73) Assignee: Denso Corporation, Kariya (JP)

( * ) Notice: Subject to any disclaimer, the term of this patent is extended or adjusted under 35 U.S.C. 154(b) by 303 days.

(21) Appl. No.: 12/805,488

(22) Filed: Aug. 3, 2010

(65) Prior Publication Data

US 2011/0106365 A1 May 5, 2011

(30) Foreign Application Priority Data

Oct. 30, 2009 (JP) ................................. 2009-250436

(51) Int. Cl.
*G01M 17/00* (2006.01)

(52) U.S. Cl.
USPC ........................... 701/29.1; 345/660; 701/400

(58) Field of Classification Search
USPC ........................ 701/29.1, 400; 345/660, 593
See application file for complete search history.

(56) References Cited

U.S. PATENT DOCUMENTS

| | | | | |
|---|---|---|---|---|
| 7,564,376 B2 * | 7/2009 | Jang | ............................ | 340/995.1 |
| 8,286,091 B2 * | 10/2012 | Takimoto | ...................... | 715/798 |
| 2005/0128065 A1 * | 6/2005 | Kolpasky et al. | ............. | 340/461 |
| 2007/0186180 A1 * | 8/2007 | Morgan | ......................... | 715/779 |
| 2008/0155414 A1 | 6/2008 | Matsuo | | |
| 2008/0209324 A1 | 8/2008 | Matsuo | | |
| 2008/0229249 A1 * | 9/2008 | Lau et al. | ....................... | 715/840 |
| 2008/0258897 A1 * | 10/2008 | Itoh et al. | ....................... | 340/461 |
| 2009/0144622 A1 * | 6/2009 | Evans et al. | .................... | 715/706 |
| 2009/0144661 A1 * | 6/2009 | Nakajima et al. | ............. | 715/835 |
| 2009/0327977 A1 | 12/2009 | Bachfischer et al. | | |
| 2010/0277495 A1 * | 11/2010 | Taguchi et al. | ............... | 345/589 |
| 2011/0257973 A1 * | 10/2011 | Chutorash et al. | ............ | 704/235 |

FOREIGN PATENT DOCUMENTS

| | | |
|---|---|---|
| JP | A-9-237039 | 9/1997 |
| JP | A-10-147187 | 6/1998 |
| JP | A-2002-168636 | 6/2002 |
| JP | A-2007-057503 | 3/2007 |
| JP | A-2008-176755 | 7/2008 |
| JP | A-2009-26239 | 2/2009 |
| JP | A-2009-090690 | 4/2009 |

OTHER PUBLICATIONS

Office Action mailed Oct. 4, 2011 in corresponding JP application No. 2009-250436 (and English translation).

* cited by examiner

*Primary Examiner* — Thomas Black
*Assistant Examiner* — Shardul Patel
(74) *Attorney, Agent, or Firm* — Posz Law Group, PLC

(57) ABSTRACT

An in-vehicle device includes: a memory for storing a gadget corresponding to an icon, a display content of which is changed with time, wherein the gadget provides a process; a display having a screen, on which the icon is displayed; an operation receiver for receiving an operation to the icon; a controller for executing the process when the controller determines that the operation receiver receives the operation to the icon under a condition that the display displays the icon; and a driving condition information obtaining element for obtaining driving condition information of a vehicle. The controller controls the display to change a display mode of the icon based on the driving condition information when the display displays the icon.

17 Claims, 6 Drawing Sheets

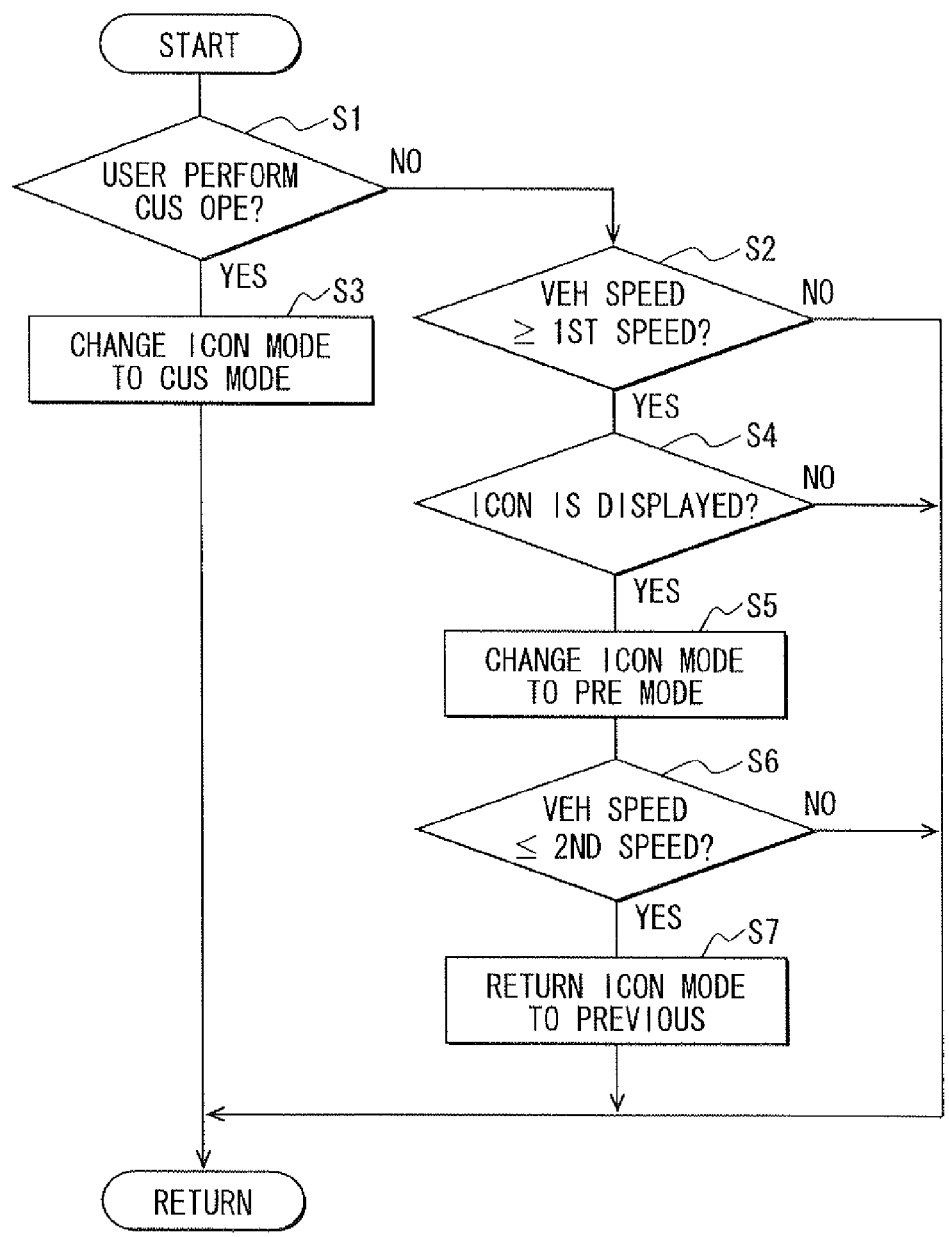

IN-VEHICLE DEVICE FOR STORING GADGET

CROSS REFERENCE TO RELATED APPLICATION

This application is based on Japanese Patent Application No. 2009-250436 filed on Oct. 30, 2009, the disclosure of which is incorporated herein by reference.

FIELD OF THE INVENTION

The present invention relates to an in-vehicle device for storing information of a gadget and for displaying an icon corresponding to the gadget on a screen.

BACKGROUND OF THE INVENTION

JP-A-2009-26239 teaches that an icon corresponding to a gadget is displayed on a screen of an information processing device such as a personal computer. The icon is a pictorial figure having a predetermined pixel for representing the contents of the gadget. In this case, when a user touches the icon on the screen, the function corresponding to the gadget is performed, or the program corresponding to the gadget is executed. Here, the gadget is a program for accessing a tool easily, which the user uses very often. The gadget is also defined as a widget.

Recently, a technique for a GUI (graphical user interface) in an in-vehicle device is much improved. The in-vehicle device may display an icon corresponding to the gadget. The in-vehicle device is mounted on a vehicle.

When the gadget such as a clock program provides information to the user, the information is changed with time. In this case, the display content of the icon on the screen is also changed with time. When the icon having the display content, which is changed with time, is displayed on a screen of the in-vehicle device, the user may watch the icon when the vehicle stops running. Further, the user may watch the icon when the vehicle runs. Thus, it is necessary to consider visibility of the icon even when the vehicle runs. Specifically, when the vehicle stops running, the user easily recognizes the icon so that the change of the contents of the icon is easily checked by the user. On the other hand, when the vehicle runs, it is difficult for the user to watch the icon sufficiently. Thus, the user may not recognize the change of the contents of the icon. As a result, the display of the icon may be useless.

SUMMARY OF THE INVENTION

In view of the above-described problem, it is an object of the present disclosure to provide an in-vehicle device for storing information of a gadget and for displaying an icon corresponding to the gadget on a screen. Visibility of the icon is improved even when the vehicle runs, and a display content of the icon is changed with time.

According to an aspect of the present disclosure, an in-vehicle device includes: a memory for storing a gadget corresponding to an icon, a display content of which is changed with time, wherein the gadget provides a process; a display having a screen, on which the icon is displayed; an operation receiver for receiving an operation to the icon; a controller for executing the process when the controller determines that the operation receiver receives the operation to the icon under a condition that the display displays the icon; and a driving condition information obtaining element for obtaining driving condition information of a vehicle. The controller controls the display to change a display mode of the icon based on the driving condition information when the display displays the icon.

In the above device, the display mode of the icon is changed so that a user of the in-vehicle device easily and visually recognizes the display content of the icon even when the content is changed with time, and the user drives the vehicle. Thus, the visibility of the icon is improved.

BRIEF DESCRIPTION OF THE DRAWINGS

The above and other objects, features and advantages of the present invention will become more apparent from the following detailed description made with reference to the accompanying drawings. In the drawings:

FIG. 2 is a flowchart showing an icon display process according to the first embodiment;

DETAILED DESCRIPTION OF THE PREFERRED EMBODIMENTS (First Embodiment)

Figure 1:
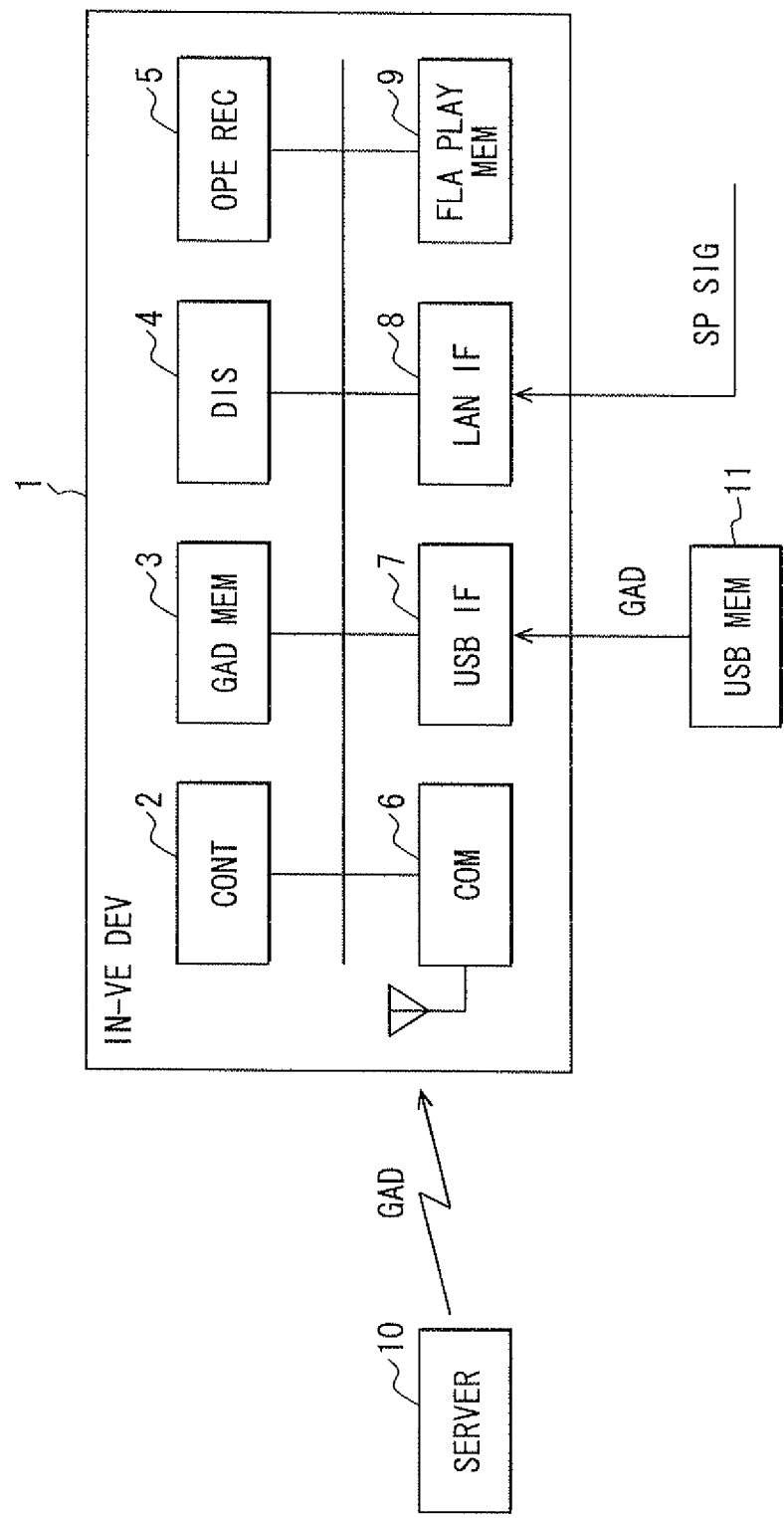
FIG. 1 is a block diagram showing an in-vehicle device according to a first embodiment.

FIG. 1 shows an in-vehicle device 1. The in-vehicle device 1 is mounted on a vehicle. The device 1 includes a controller 2, a gadget memory 3, a display unit 4, an operation receiver 5, a communication unit 6, a USB interface 7, an in-vehicle LAN interface 8 and a flash player memory 9, which are coupled with each other. The in-vehicle LAN interface 8 provides a driving condition obtaining element for obtaining driving condition information.

The controller 2 includes a CPU, a RAM and a ROM. The controller 2 executes a control program so that the controller 2 controls operation of the in-vehicle device 1. Here, the operation of the in-vehicle device 1 is, for example, data management operation and communication operation. The gadget memory 3 stores a gadget received by a communication unit 6 from a server 10 via a broad band wireless communication line such as a mobile communication line and a fixed communication line. Further, the memory 3 stores a gadget transmitted from a USB memory 11 to a USB interface 7. The USB memory 11 is detachable from the in-vehicle device 1.

The gadget to be stored in the memory 3 is, for example, a program for providing information, which is changed with time. Specifically, when the gadget is a clock program, the information is time information so that the time information is changed with time. Alternatively, the gadget may be a program for providing information, which is not changed with time. Specifically, when the gadget is an image display program, the information is image information so that the image information is not changed with time. When the gadget is the program for providing time variant information to the user, the display contents of the icon corresponding to the gadget is changed with time. For example, when the icon is an image of an analog clock, a hand of the clock is changed with time. When the icon is an image of a digital clock, a numeral is changed with time. When the gadget is the program for providing constant information, which is not changed with time, the display contents of the icon corresponding to the gadget is not changed with time.

The display unit 4 is a liquid crystal display device, for example. When a display instruction signal is input from the controller 2 into the unit 4, the unit 4 displays an image on a screen based on the display instruction signal. The operation receiver 5 is, for example, a touch switch, which is formed on the screen of the display unit 4. When the user touches the touch switch, i.e., when the user operates the touch switch, an operation, detection signal corresponding to operation contents of the touch switch is output to the controller 2.

The in-vehicle LAN interface 8 is coupled with a ECU and a sensor via an in-vehicle LAN. The ECU and the sensor are mounted on the vehicle. In the present embodiment, the sensor is a vehicle speed sensor, and a vehicle speed signal is input into the interface 8 from the speed sensor. The speed signal corresponds to a vehicle speed pulse signal generated in the speed sensor. The flash player memory 9 stores a flash player, which is a program for displaying an electric file defined as a swf file. The swf file is formed with using a Flash (which is a registered trademark) of Adobe Systems Incorporated.

When the controller 2 controls the flash player stored in the flash player memory 9 to activate, the icon corresponding to the gadget stored in the gadget memory 3 is displayed on the screen of the display unit 4. In this case, the icon functions as a touch switch. When the icon is operated, i.e., when the icon is touched, the function corresponding to the gadget is called up, or the program is executed. Specifically, the controller 2 stores the gadget of, for example a clock, in the gadget memory 3. The icon for representing the clock visually is displayed on the screen of the display unit 4. When the icon is operated, the function of the clock is activated, and the function of an alarm or the function of a stop-watch is executed. Here, when the controller 2 determines that the user performs a customization operation under a normal state that the icon corresponding to the gadget is customizable, the icon corresponding to the gadget is customized according to the customization operation. The customization operation is, for example, to change a display mode of the icon freely according to the user preference. The display mode represents a display size, a display color, a display position and the like.

The in-vehicle device 1 is activated, i.e., switched on when a ACC (accessory) switch turns on. The in-vehicle device 1 is not activated, i.e., switched off when the ACC switch turns off. The in-vehicle device 1 may be a navigation system for executing a function to display a map, a function to specify a current position of the vehicle, a function to display the current position of the vehicle on the map, a function to set a destination, a function to search a route from the current position to the destination, and the like.

Next, the above operation of the in-vehicle device 1 will be explained with reference to FIGS. 2 to 5.

The controller 2 is in a switch-on state when the ACC switch turns on. In this case, the controller 2 determines in step S1 whether the user performs the customization operation according to the operation detection signal input from the operation receiver 5. When the controller 2 determines that the user does not perform the customization operation, it goes to step S2. In step S2, the controller determines whether the vehicle speed is equal to or lager than a first predetermined speed such as 10 km/h according to the vehicle speed signal, which is input from the vehicle speed sensor via the in-vehicle LAN to the LAN interface 8. Here, the first predetermined speed may be preliminary set by the user. Alternatively, the first predetermined speed may be set in a manufacturing process before the device 1 is shipped.

When the controller 2 determines that the user performs the customization operation, i.e., when the determination in step S1 is "YES," it goes to step S3. In step S3, the controller 2 customizes the display mode of the icon corresponding to the gadget according to the customization operation. Then, it returns, i.e., it returns to step S1.

When the controller 2 determines in step S2 that the vehicle speed is equal to or larger than the first predetermined speed, i.e., when the determination of step S2 is "YES," it goes to step S4. In step S4, the controller 2 determines whether the icon corresponding to the gadget is displayed on the screen of the display unit 4, the contents of the gadget being changed with time. When the controller 2 determines that the icon is displayed on the screen of the display unit 2, i.e., when the determination in step S4 is "YES," it goes to step S5. In step S5, the display mode of the icon is changed to a predetermined display mode.

Next, the controller 2 determines based on the vehicle speed signal in step S6 whether the vehicle speed is equal to or smaller than a second predetermined speed such as 3 km/h. The second predetermined speed in smaller than the first predetermined speed. The second predetermined speed may be set by the user preliminary. Alternatively, the second predetermined speed may be set in a manufacturing process before the device 1 is shipped. When the controller 2 determines that the vehicle speed is equal to or smaller than the second predetermined speed, i.e., when the determination of step S6 is "YES," it goes to step S7. In step S7, the display mode of the icon corresponding to the gadget is returned to the previous display mode, which is the display mode before changing. Then, it returns to step S1.

An example for changing the display mode of the icon corresponding to the gadget will be explained when the controller 2 execute the above process. The controller 2 controls the gadget memory to store the gadget of the clock, and controls the display unit 4 to display the icon of the clock on the screen. The icon of the clock represents visually the clock. Then, when the controller 2 determines that the vehicle speed is equal to or larger than the first predetermined speed, the display mode of the icon is changed to the predetermined display mode.

Figure 3A:
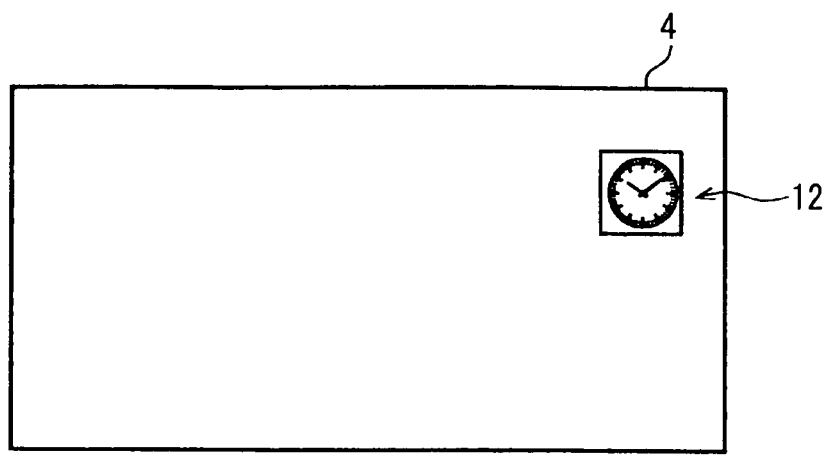
FIGS. 3A and 3B are diagrams showing an icon on a screen corresponding to a gadget.
Figure 3B:
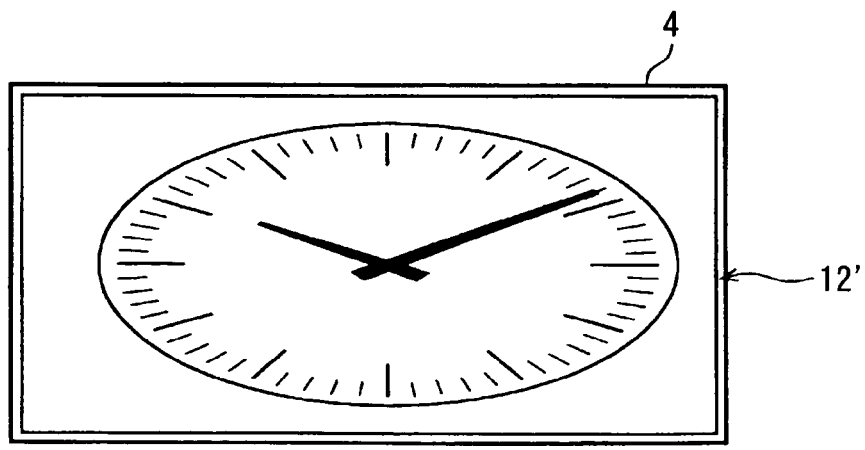

Specifically, as shown in FIGS. 3A and 3B, when the controller determines that the vehicle speed is equal to or larger than the first predetermined speed, the controller 2 switches a state shown in FIG. 3A to another state shown in FIG. 3B. Here, the state shown in FIG. 3A is such that the icon 12 of the analog type clock is displayed in an area of the screen, which is comparatively small, compared with a whole area of the screen of the display unit 4. Further, the state in FIG. 3A is a normal state, in which the icon 12 is customizable. The other state in FIG. 3B is such that the icon 12' is displayed in an area of the screen, which is comparatively large with respect to the whole area of the screen of the display unit 4. Specifically, the controller 2 enlarges the display size of the icon 12.

Figure 4A:
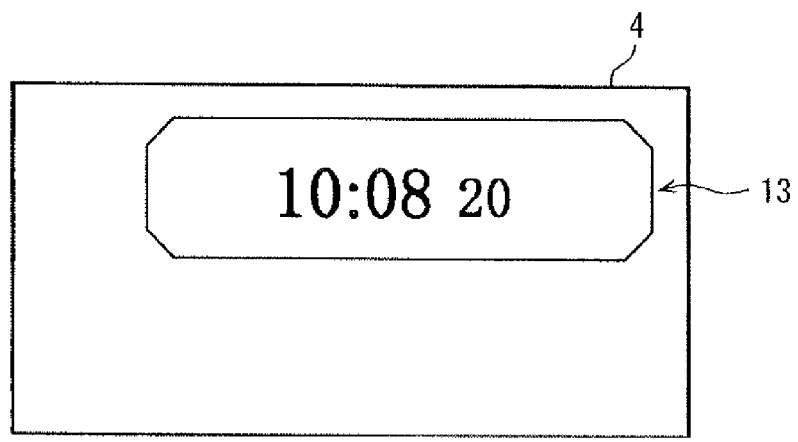
FIGS. 4A and 4B are diagrams showing another icon on the screen corresponding to another gadget.
Figure 4B:
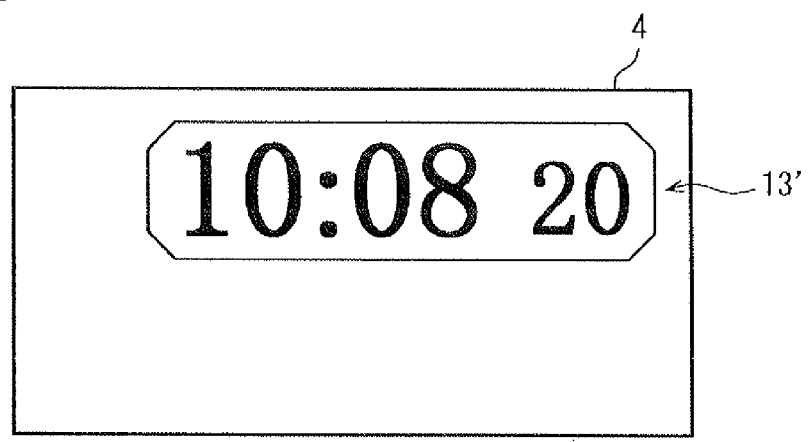

Alternatively, as shown in FIGS. 4A and 4B, the display unit 4 displays the icon 13 of the digital type clock on the screen. When the controller determines that the vehicle speed is equal to or larger than the first predetermined speed, the controller 2 switches a state shown in FIG. 4A to another state shown in FIG. 4B. Here, the state shown in FIG. 4A is such that the display size of each digit in a frame of the icon 13 is displayed on the screen to be comparatively small. Further, the state in FIG. 4A is a normal state, in which the icon 13 is customizable. The other state in FIG. 4B is such that the display size of each digit in a frame of the icon 13' is displayed on the screen to be comparatively large. Specifically, the controller 2 enlarges the display size of the digits in the frame of the icon 13.

Figure 5A:
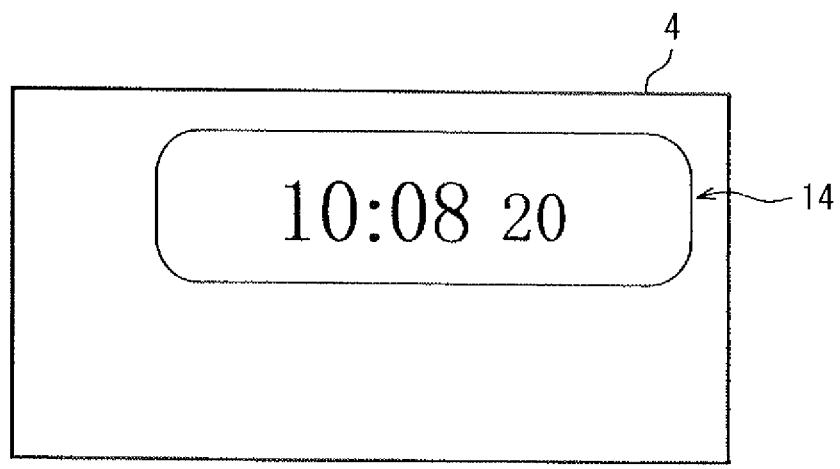
FIGS. 5A and 5B are diagrams showing another icon on the screen corresponding to another gadget.
Figure 5B:
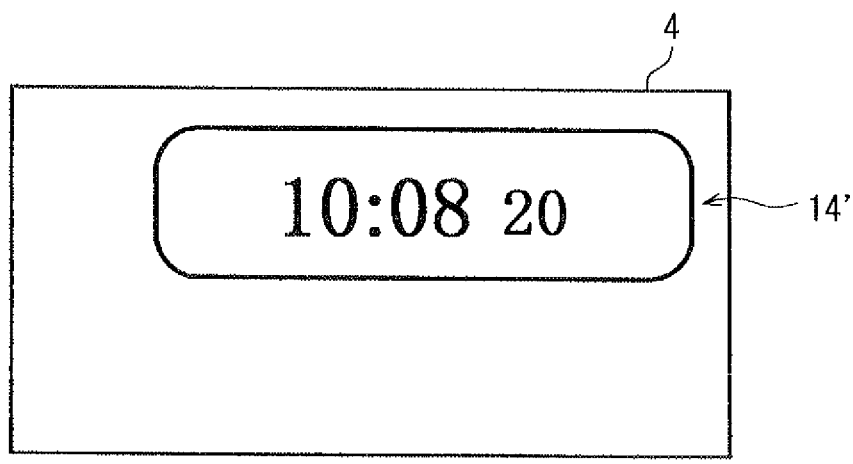

Alternatively, as shown in FIGS. 5A and 5B, the display unit 4 displays the icon 14 of the digital type clock on the screen, for example. When the controller determines that the vehicle speed is equal to or larger than the first predetermined speed, the controller 2 switches a state shown in FIG. 5A to another state shown in FIG. 5B. Here, the state shown in FIG. 5A is such that the icon 14 is displayed to have a small difference between a background color of an inside of a frame of the icon 14 and a background color of a region of the screen other than the icon 14. Further, the state in FIG. 5A is a normal state, in which the icon 14 is customizable. The other state in FIG. 5B is such that the icon 14' is displayed to have a large difference between a background color of an inside of a frame of the icon 14' and a background color of a region of the screen other than the icon 14. Specifically, the controller 2 changes a display color of the background of the icon 14 itself and the other region of the screen to increase the difference. In this case, the icon 14' is easily viewable from the background of the other region of the screen. For example, the background color of the icon 14 may be an advancing color or an expansive color. The advancing color seems to be in front of another color although the advancing color is applied on the same plane. The expansive color is a bright color and seems to be expanded largely. In FIG. 5, a thin line of an outline of the icon 14 means that the difference between the background color of the icon 14 and the background color of the other region is small. A thick line in FIG. 5 of the outline of the icon 14' means that the difference between the background color of the icon 14 and the background color of the other region is large.

When the icon corresponding to the gadget, the content of which is changed with time, is displayed, the controller 2 controls the display unit 4 to change the display mode by any procedure for changing the mode described above so that the user easily and visually recognizes the content of the icon. The above procedures for changing the display mode may be combined. Specifically, the display size and the display color may be changed at the same time.

In the in-vehicle device 1 according to the first embodiment, when the icon such as a clock icon, the content of which is changed with time, is displayed, and the vehicle runs, the display mode of the icon is changed so that the user easily and visually recognizes the content of the icon. Thus, the user can visually recognizes the changing content of the icon. Thus, the visibility of the icon is improved when the user recognizes the icon while the driver drives the vehicle.

(Second Embodiment)

Figure 6:
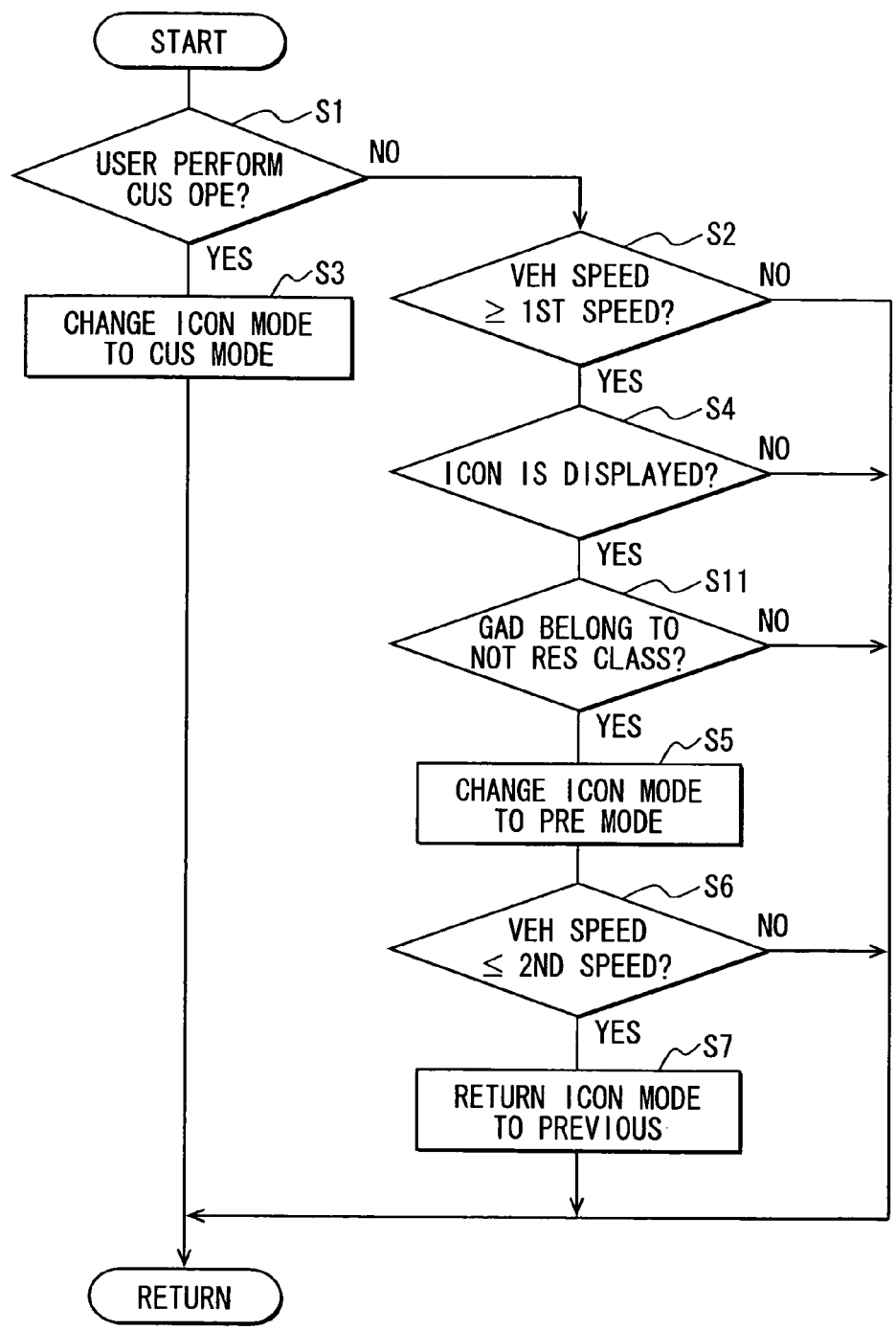
FIG. 6 is a flowchart showing an icon display process according to a second embodiment.

FIG. 6 shows an icon display process according to a second embodiment.

In the second embodiment, in view of the safety of the user when the user drives the vehicle, the display mode of the icon, the content of which is changed with time, is changed to be easily recognized by the user under a condition that the gadget corresponding to the icon belongs to a process restriction class so that the function corresponding to the icon is limited when the vehicle runs. Here, the gadget is classified into two classes. One class is a process not-restricted class, and the other class is a process restriction class. When the gadget belongs to the process not-restricted class, the function corresponding to the icon is not limited even when the vehicle runs.

When the controller 2 determines that the vehicle speed is equal to or larger than the first predetermined speed, i.e., when the determination in step S2 is "YES," and when the controller 2 determines that the icon corresponding to the gadget, the content of which is changed with time, is displayed, i.e., when the determination of step S4 is "YES," it goes to step S11. In S17, the controller 2 determines whether the icon corresponds to the gadget, which belongs to the process not-restricted class. When the controller 2 determines that the icon corresponds to the gadget, which belongs to the process not-restricted class, i.e., when the determination of step S11 is "YES," it goes to step S5. In step S5, the display mode of the icon is changed to a predetermined display mode. After step S5, steps S6 and S7, which are similar to the first embodiment.

When the controller 2 determines that the icon corresponds to the gadget, which belongs to the process restriction class, i.e., when the determination in step S11 is "NO," the icon corresponding to the gadget, which belongs to the process restriction class, is not changed. For example, when the gadget is a browse or an edit of a text document for a mail or a news site, the gadget belongs to the process restriction class.

In the in-vehicle device according to the second embodiment, in a case where the icon such as a clock icon, the content of which is changed with time, is displayed, and the vehicle runs, the display mode of the icon is changed so that the user easily and visually recognizes the content of the icon when the icon corresponds to the gadget, which belongs the process not-restricted class. Thus, the user can visually recognizes the changing content of the icon, which belongs to the process not-restricted class. Thus, the visibility of the icon is improved when the user recognizes the icon while the driver drives the vehicle. Further, since the display mode of the icon corresponding to the gadget, which belongs to the process restriction class, is not changed, the safety of the driving is secured.

(Other Embodiments)

The gadget corresponding to the icon, the content of which is changed with time, may be a clock gadget, a weather report gadget, a temperature gadget and the like.

The gadget corresponding to the icon that the content is changed with time may be defined such that the content of the icon is changed within a predetermined period. The predetermined period is set preliminary to be, for example, one day or one month. When the content of the icon is not changed within the predetermined period, the gadget corresponding to the icon is not defined as the gadget corresponding to the icon that the content is changed with time. In this case, the gadget is excluded from an object of the gadget.

The display size of the icon is changed, as shown in FIGS. 3A to 4B. Alternatively, when the icon merely includes a digit or a character, the digit or the character may be changed to be large. In FIGS. 5A and 5B, the background color of the icon is changed to the advancing color or the expansive color. Alternatively, the background color of the region other than the icon may be change to a retreating color or a contracting color. The retreating color seems to recede behind another color although the retreating color is applied on the same plane. The contracting color is a dark color seems to be contracted small.

Alternatively, the display position on the screen may be changed. Specifically, for example, when the vehicle is a right steering wheel vehicle, the icon may be displaced from a left side to a right side of the screen. Here, the left side of the screen is a far side with respect to the driver, and the right side of the screen is a near side with respect to the driver. Alternatively, the display size, the display color and the display position may be changed at the sate time.

In the above embodiments, the controller 2 determines based on the vehicle speed signal input from the vehicle speed sensor into the LAN interface 8 whether the vehicle runs. Alternatively, a shift lever position signal for representing a shift lever position such as a parking position, a driving position, a neutral position and the like, an acceleration opening degree signal for representing an opening degree of acceleration, a brake operation signal for representing operation of a brake and the like may be input into the LAN interface 8. Then, the controller 2 may determine based on the shift lever position signal, the acceleration opening degree signal, the brake operation signal and the like whether the vehicle runs.

Alternatively, the controller 2 may determine based on a combination among the vehicle speed signal, the shift lever position signal, the acceleration opening degree signal, the brake operation signal and the like whether the vehicle runs. In this case, since the controller 2 determines based on multiple signals whether the vehicle runs, the controller 2 can determine based on other signals whether the vehicle runs even if one signal is not proper or abnormal. For example, even if the shift lever position signal is not input into the LAN interface 8, or even if the shift lever position signal always represents the parking position, the controller determines based on the vehicle speed signal, the acceleration opening degree signal, the brake operation signal and the like whether the vehicle runs. As a result, the safety of a passenger in the vehicle is secured.

Further, a GPS receiver for receiving a GPS signal from a GPS satellite, an acceleration sensor in a vehicle width direction for detecting acceleration along with the vehicle width direction, an acceleration sensor in a vehicle length direction for detecting acceleration along with the vehicle length direction or the like may be mounted on the vehicle. In this case, the controller 2 may determine based on the information about movement of the vehicle position obtained from the GPS receiver, the acceleration sensors and the like whether the vehicle runs.

The above disclosure has the following aspects.

According to an aspect of the present disclosure, an in-vehicle device includes: a memory for storing a gadget corresponding to an icon, a display content of which is changed with time, wherein the gadget provides a process; a display having a screen, on which the icon is displayed; an operation receiver for receiving an operation to the icon; a controller for executing the process when the controller determines that the operation receiver receives the operation to the icon under a condition that the display displays the icon; and a driving condition information obtaining element for obtaining driving condition information of a vehicle. The controller controls the display to change a display mode of the icon based on the driving condition information when the display displays the icon.

In the above device, the display mode of the icon is changed so that a user of the in-vehicle device easily and visually recognizes the display content of the icon even when the content is changed with time, and the user drives the vehicle. Thus, the visibility of the icon is improved.

Alternatively, the driving condition information may include vehicle speed information, and the controller controls the display to change the display mode of the icon based on the vehicle speed information. In this case, the controller determines based on the vehicle speed whether the vehicle runs. Accordingly, the controller determines the driving condition information appropriately.

Alternatively, the memory may store the gadget together with class information. The class information represents whether the gadget belongs to a process restriction class, and the controller controls the display to change the display mode of the icon based on the driving condition information and the class information. The display mode of the icon is changed under a condition that the gadget does not belong to process restriction class. Further, the process may be restricted in a case where the gadget belongs to the process restriction class, and the vehicle runs even when the controller determines that the operation receiver receives the operation to the icon, and the controller may execute the process without restriction in a case where the gadget does not belongs to the process restriction class, and the controller determines that the operation receiver receives the operation to the icon even when the vehicle runs.

Alternatively, the display mode of the icon may include a display size of the icon, and the controller controls the display to change the display size of the icon based on the driving condition information.

Alternatively, the display mode of the icon may include a display color of the icon, and the controller controls the display to change the display color of the icon based on the driving condition information.

Alternatively, the display mode of the icon may include a display position of the icon, and the controller controls the display to change the display position of the icon based on the driving condition information.

Alternatively, the controller may control the display to change the display mode of the icon when the controller determines that a vehicle speed is equal to or larger than a first predetermined speed. The controller may control the display to restore the display mode of the icon when the controller determines that the vehicle speed is equal to or smaller than a second predetermined speed after the display mode of the icon is changed. The second predetermined speed is smaller than the first predetermined speed. Further, the display mode of the icon may include a display size of the icon. The controls the display to enlarge the display size of the icon when the controller determines that the vehicle speed is equal to or larger than the first predetermined speed, and the controller controls the display to reduce the display size of the icon when the controller determines that the vehicle speed is equal to or smaller than the second predetermined speed after the display size of the icon is enlarged.

Alternatively, the display mode of the icon may include a display color of the icon. The controller controls the display to change the display color of the icon to be an advancing color or an expansive color when the controller determines that the vehicle speed is equal to or larger than the first predetermined speed, and the controller controls the display to restore the display color of the icon when the controller determines that the vehicle speed is equal to or smaller than the second predetermined speed after the display size of the icon is enlarged.

Alternatively, the display mode of the icon may include a display position of the icon. The controller controls the display to change the display position of the icon to be nearer an user of the in-vehicle device when the controller determines that the vehicle speed is equal to or larger than the first predetermined speed, and the controller controls the display to restore the display position of the icon when the controller determines that the vehicle speed is equal to or smaller than the second predetermined speed after the display size of the icon is enlarged:

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are pre-

What is claimed is:

1. An in-vehicle device comprising:
a memory for storing a gadget corresponding to an icon, a display content of which is changed with time, wherein the gadget provides a process;
a display having a screen, on which the icon is displayed;
an operation receiver for receiving an operation to the icon;
a controller for executing the process when the controller determines that the operation receiver receives the operation to the icon under a condition that the display displays the icon; and
a driving condition information obtaining element for obtaining driving condition information of a vehicle, wherein the driving condition information includes vehicle speed information,
wherein the controller is further configured to
determine whether the display displays the icon, the display content of which is changed with time, on the screen,
control the display to change a display mode of the icon based on the driving condition information, when the controller determines that the display displays the icon, the display content of which is changed with time, on the screen,
determine from the vehicle speed information whether a vehicle speed is equal to or larger than a first predetermined speed, and
enlarge a display of the icon, when the vehicle speed is determined to be equal to or larger than the first predetermined speed and the display is determined to display the icon, the display content of which is changed with time, on the screen.

2. The in-vehicle device according to claim 1,
wherein the controller further controls the display to change the display mode of the icon based on the vehicle speed information.

3. The in-vehicle device according to claim 1,
wherein the memory stores the gadget together with class information,
wherein the class information represents whether the gadget belongs to a process restriction class, and
wherein the controller controls the display to change the display mode of the icon based on the driving condition information and the class information.

4. The in-vehicle device according to claim 3,
wherein the process is restricted in a case where the gadget belongs to the process restriction class, and the vehicle runs even when the controller determines that the operation receiver receives the operation to the icon, and
wherein the controller executes the process without restriction in a case where the gadget does not belongs to the process restriction class, and the controller determines that the operation receiver receives the operation to the icon even when the vehicle runs.

5. The in-vehicle device according to claim 1,
wherein the display mode of the icon includes a display size of the icon, and
wherein the controller controls the display to change the display size of the icon based on the driving condition information.

6. The in-vehicle device according to claim 1,
wherein the display mode of the icon includes a display color of the icon, and
wherein the controller controls the display to change the display color of the icon based on the driving condition information.

7. The in-vehicle device according to claim 1,
wherein the display mode of the icon includes a display position of the icon, and
wherein the controller controls the display to change the display position of the icon based on the driving condition information.

8. The in-vehicle device according to claim 2,
wherein the controller controls the display to change the display mode of the icon when
the controller determines that the vehicle speed is equal to or larger than the first predetermined speed,
wherein the controller controls the display to restore the display mode of the icon when the controller determines that the vehicle speed is equal to or smaller than a second predetermined speed after the display mode of the icon is changed, and
wherein the second predetermined speed is smaller than the first predetermined speed.

9. The in-vehicle device according to claim 8,
wherein the display mode of the icon includes a display size of the icon,
wherein the controller controls the display to enlarge the display size of the icon when the controller determines that the vehicle speed is equal to or larger than the first predetermined speed, and
wherein the controller controls the display to reduce the display size of the icon when the controller determines that the vehicle speed is equal to or smaller than the second predetermined speed after the display size of the icon is enlarged.

10. The in-vehicle device according to claim 8,
wherein the display mode of the icon includes a display color of the icon,
wherein the controller controls the display to change the display color of the icon to be an advancing color or an expansive color when the controller determines that the vehicle speed is equal to or larger than the first predetermined speed, and
wherein the controller controls the display to restore the display color of the icon when the controller determines that the vehicle speed is equal to or smaller than the second predetermined speed after the display size of the icon is enlarged.

11. The in-vehicle device according to claim 8,
wherein the display mode of the icon includes a display position of the icon,
wherein the controller controls the display to change the display position of the icon to be nearer an user of the in-vehicle device when the controller determines that the vehicle speed is equal to or larger than the first predetermined speed, and
wherein the controller controls the display to restore the display position of the icon when the controller determines that the vehicle speed is equal to or smaller than the second predetermined speed after the display size of the icon is enlarged.

12. The in-vehicle device according to claim 1,
wherein the gadget consists essentially of a clock program, and the display content which is changed with time is a clock hand position or a clock numeral operated by the clock program.

13. The in-vehicle device according to claim 1,
wherein
the gadget is a graphical user interface gadget, and the program corresponding to the gadget is activated by a touch to the icon on the display by a user of the in-vehicle device.

14. The in-vehicle device according to claim 1, wherein the controller is further configured to cancel the change of the display mode of the icon, when the controller determines that the display does not display the icon, the display content of which is changed with time, on the screen.

15. The in-vehicle device according to claim 3, wherein the gadget that belongs to the process restriction class consists essentially of a browser, a text document edit, a mail, or a news site.

16. An in-vehicle device comprising:

a memory configured to store a gadget corresponding to an icon, a display content of which is changed with time, wherein the gadget provides a process;

a display having a screen, on which the icon is displayed;

an operation receiver configured to receive an operation to the icon;

a controller configured to execute the process when the controller determines that the operation receiver receives the operation to the icon under a condition that the display displays the icon and a driving condition information obtaining element configured to obtain driving condition information of a vehicle, wherein the control is configured to control the display to change a display mode of the icon based on the driving condition information, when the display displays the icon, wherein the display mode of the icon includes a display position of the icon, and wherein the controller is configured to control the display to change the display position of the icon which is already displayed on the display based on a vehicle speed.

17. The in-vehicle device according to claim 12, wherein the controller controls the display to displace the icon to a near side of a driver of a vehicle.

\* \* \* \* \*